(12) United States Patent
Faller

(10) Patent No.: US 8,442,819 B2
(45) Date of Patent: *May 14, 2013

(54) DISTORTION-BASED METHOD AND APPARATUS FOR BUFFER CONTROL IN A COMMUNICATION SYSTEM

(75) Inventor: Christof Faller, Murray Hill, NJ (US)

(73) Assignee: Agere Systems LLC, Allentown, PA (US)

( * ) Notice: Subject to any disclaimer, the term of this patent is extended or adjusted under 35 U.S.C. 154(b) by 1710 days.

This patent is subject to a terminal disclaimer.

(21) Appl. No.: 11/403,530

(22) Filed: Apr. 13, 2006

(65) Prior Publication Data

US 2006/0184358 A1 Aug. 17, 2006

Related U.S. Application Data

(63) Continuation of application No. 09/948,431, filed on Sep. 7, 2001, now Pat. No. 7,062,429.

(51) Int. Cl.
*G10L 19/02* (2006.01)
(52) U.S. Cl.
USPC ........ 704/229; 704/200.1; 704/219; 704/224; 704/220
(58) Field of Classification Search .................. 704/220, 704/200.1, 222, 205, 219, 500–503, 208, 704/230, 225, 226, 229, 224; 375/240.08, 375/240.12
See application file for complete search history.

(56) References Cited

U.S. PATENT DOCUMENTS

| 5,623,577 | A | 4/1997 | Fielder | 704/200.1 |
|---|---|---|---|---|
| 5,650,825 | A * | 7/1997 | Naimpally et al. | 348/465 |
| 5,675,701 | A | 10/1997 | Kleijn et al. | 704/222 |
| 5,687,282 | A | 11/1997 | Van De Kerkhof | 704/205 |
| 5,778,335 | A | 7/1998 | Ubale et al. | 704/219 |
| 5,787,390 | A | 7/1998 | Quinquis et al. | 704/219 |
| 5,844,607 | A * | 12/1998 | Gebler et al. | 375/240.01 |
| 5,956,674 | A | 9/1999 | Smyth et al. | 704/200.1 |
| 5,956,686 | A * | 9/1999 | Takashima et al. | 704/500 |
| 6,094,636 | A | 7/2000 | Kim | 704/500 |
| 6,260,010 | B1 | 7/2001 | Gao et al. | 704/230 |
| 6,320,825 | B1 * | 11/2001 | Bruekers et al. | 369/30.17 |
| 6,330,533 | B2 | 12/2001 | Su et al. | 704/220 |
| 6,434,196 | B1 | 8/2002 | Sethuraman et al. | 375/240.12 |
| 6,542,545 | B1 | 4/2003 | Vetro et al. | 375/240.08 |
| 7,062,429 | B2 * | 6/2006 | Faller | 704/200.1 |

OTHER PUBLICATIONS

U.S. Appl. No. 09/477,314, filed Jan. 4, 2000, entitled "Perceptual Audio Coder Bit Allocation Scheme Providing Improved Perceptual Quality Consistency".

* cited by examiner

*Primary Examiner* — Vijay B Chawan
(74) *Attorney, Agent, or Firm* — Ryan, Mason & Lewis, LLP

(57) ABSTRACT

Methods and apparatus are disclosed for controlling a buffer in a communication system, such as a digital audio broadcasting (DAB) communication system. A more consistent perceptual quality over time provides for a more pleasing auditory experience to a listener. The disclosed bit allocation process determines, for each frame, a distortion d[k] at which the frame is to be encoded. The distortion d[k] is determined to minimize (i) the probability for a buffer overflow, and (ii) the variation of perceived distortion over time. A buffer level is controlled by partitioning a signal into a sequence of successive frames; estimating a distortion rate for a number of frames; and selecting a distortion such that the variance of the buffer level is bounded by a specified value.

23 Claims, 4 Drawing Sheets

DISTORTION-BASED METHOD AND APPARATUS FOR BUFFER CONTROL IN A COMMUNICATION SYSTEM

CROSS-REFERENCE TO RELATED APPLICATIONS

This application is a continuation of U.S. patent application Ser. No. 09/948,431, filed Sep. 7, 2001 now U.S. Pat. No. 7,062,429.

FIELD OF THE INVENTION

The present invention relates generally to digital audio broadcasting (DAB) and other types of digital communication systems, and more particularly, to buffer control techniques for such digital communication systems.

BACKGROUND OF THE INVENTION

Proposed systems for providing digital audio broadcasting are expected to provide near compact disk (CD)-quality audio, data services and more robust coverage than existing analog FM transmissions. Digital audio broadcasting systems compress an audio signal using a digital audio encoder, such as a perceptual audio coder (PAC). Perceptual audio coders reduce the amount of information needed to represent an audio signal by exploiting human perception and minimizing the perceived distortion for a given bit rate. Perceptual audio coders are described, for example, in D. Sinha et al., "The Perceptual Audio Coder," Digital Audio, Section 42, 42-1 to 42-18, (CRC Press, 1998), incorporated by reference herein. Generally, the amount of information needed to represent an audio signal is reduced using two well-known techniques, namely, irrelevancy reduction and redundancy removal. Irrelevancy reduction techniques attempt to remove those portions of the audio signal that would be, when decoded, perceptually irrelevant to a listener. This general concept is described, for example, in U.S. Pat. No. 5,341,457, entitled "Perceptual Coding of Audio Signals," by J. L. Hall and J. D. Johnston, issued on Aug. 23, 1994, incorporated by reference herein.

FIG. 1 illustrates a conventional audio communication system 100. As shown in FIG. 1, the communication system 100 employs a radio transmission link 130 that is typically of a fixed bit rate. The bit rate of the audio encoder 110, on the other hand, is typically variable, depending on the complexity of the current audio signal and the audio quality requirements. On average, the bit rate of the audio encoder 110 is equal to or less than the capacity of the transmission link 130, but at any given instance the bit rate of the audio coder 110 may be higher. If data from the audio encoder 110 was applied directly to the transmission link 130, data would be lost each time the instantaneous bit rate of the encoder 110 exceeded the capacity of the transmission link 130. In order to prevent such a loss of data, the output of the encoder 110 is buffered into a first-in-first-out (FIFO) buffer 120 before being applied to the transmission link 130. If the instantaneous bit rate of the encoder 110 is higher than the bit rate of the transmission link, the amount of data in the FIFO buffer 120 increases. Similarly, if the instantaneous bit rate of the encoder 110 is lower than the bit rate of the transmission link 130, the amount of data in the FIFO buffer 120 decreases.

As shown in FIG. 1, the encoder 110 includes a buffer control logic element 115 that modifies the bit rate of the encoder 110 and prevents the encoder 110 from overflowing or underflowing the FIFO buffer 120. Overflow causes a loss of bits, while an underflow wastes some of the capacity the transmission link 130. The buffer control logic element 115 determines for each frame the number of bits, $M_d[k]$, that the audio encoder 110 can use to encode the frame, based on the current level, $l[k]$, of the buffer 120. The encoder 110 iteratively encodes the frame until the number of bits used is close to the number of allocated bits, $M_d[k]$.

As a result of this scheme, the transmission delay is also variable. The delay between the time when an audio packet is first written into the FIFO buffer 120 and the time when the packet is actually received by the receiver 150 depends, among other factors, on the amount of data that is currently stored in the FIFO buffer 120. However, the audio decoder 170 at the receiver 150 needs to get audio packets at a fixed rate (of packets per second) in order to play continuously. Therefore, it is necessary to buffer the audio data at the decoder 170 by using a buffer 160. The decoder input-buffer 160 has to have enough capacity so that even in the worst case of minimal delay and largest packet size, the buffer 160 will not overflow. In addition, the initialization period has to be sufficiently long to accumulate enough packets in the buffer 160 so that the buffer does not become empty due to transmission delays.

Due to the nature of audio signals and the effects of the psychoacoustic model employed by the perceptual audio coder 110, the bit rate (i.e., the number of bits requested by the quantizer to code the given frame) typically varies with a large range from frame to frame. Thus, the encoder 110 employs a bit allocation scheme that ensures that the average bit rate remains relatively close to the desired bit rate and that the buffer 120 does not overflow (when the buffer is full) or underflow (when the buffer runs empty). Given the bit demand of the initially encoded frame and the state of the buffer 120, the bit allocation scheme decides how many bits are actually given to the quantizer (not shown) to code the frame. Specifically, the quantizer step sizes are then modified in an attempt to match the allowed number of bits, $M_d[k]$, and the frame is then re-coded with the modified step sizes, after which the bit allocator again makes a determination of the number of bits to actually be given to the quantizer. This process iterates until the frame is quantized and coded with a number of bits sufficiently close to the number actually granted by the buffer control logic element 115.

Perceptual audio coders quantize the spectral components of an audio signal such that the quantization noise follows a noise threshold determined by the perceptual model. With this approach, the bit demand which results in an appropriate range of average bit demand can be well below the bit rate that would be necessary to achieve transparency. Therefore, one disadvantage of having to use different noise thresholds for different target bit rates is the necessity of manually tuning the psychoacoustic model of the perceptual audio coder 110 for each specific target bit rate, in order to achieve a reasonable level of efficiency and performance. However, since different types of audio signals result in significantly different bit demands, even providing for such a manual tuning process may not result in a perceptual audio coder 110 that works well for all types of audio signals, or even one that works well for a single audio signal having characteristics that vary over time. The typical result is that the perceptual audio coder 110 provides a quality level which varies significantly over time, due to a failure of the buffer control logic element 115 to allocate bits to consecutive frames in such a manner so as to ensure that they are coded with a relatively consistent quality level.

U.S. patent application Ser. No. 09/477,314, filed Jan. 4, 2000, entitled "Perceptual Audio Coder Bit Allocation Scheme Providing Improved Perceptual Quality Consistency," discloses a bit rate control technique that partitions an audio signal into successive frames, and estimates a bit rate for each of a plurality of preselected distortion levels. Generally, the estimated bit rate that is closest to the desired bit rate, $M_d[k]$, and provides an acceptable level of distortion is selected. Thus, the disclosed buffer control technique employs a bit allocation scheme that considers the characteristics of a plurality of frames and analyzes the bit requirements of coding each of these frames at various levels of perceptual quality. The disclosed buffer control technique provides a relatively consistent perceptual quality from one frame to the next, with an acceptable bit rate for the communication system.

For broadcasting applications, the desired end-to-end delay is limited by the cost of the decoder and the tune-in time, i.e., the time it takes between a request for playback and the time when the audio actually plays back. Therefore, a need exists for an improved buffer control technique that minimizes the variation in the distortion for a given limited buffer size.

SUMMARY OF THE INVENTION

Generally, a method and apparatus are disclosed for controlling a buffer in a communication system, such as a digital audio broadcasting (DAB) communication system. The present invention recognizes that a more consistent perceptual quality over time provides for a more pleasing auditory experience to a listener. The present invention further recognizes that a more consistent perceptual quality is achieved over time using a relatively constant distortion level. Thus, according to one aspect of the invention, the bit allocation process determines, for each frame, a distortion d[k] at which the frame is to be encoded. Generally, the distortion d[k] is determined to minimize (i) the probability for a buffer overflow, and (ii) the variation of perceived distortion over time. In particular, the present invention reduces the local variation in the distortion by encoding each frame with a distortion based on statistical bit rate estimations.

The present invention controls a buffer level in a communication system by partitioning a signal into a sequence of successive frames; estimating a distortion rate for a number of frames; and a buffer control element selects a distortion such that the variance of the buffer level is bounded by a specified value. In one particular implementation, a signal is coded by partitioning the signal into a sequence of successive frames; encoding each frame k for each of a plurality of distortions $D_i$ to compute a frame bitrate; estimating an average bitrate $R_i[k]$ for each of said plurality of distortions $D_i$ given current and past frame bitrates; interpolating between each of said pair of values for said average bitrate $R_i[k]$ and said plurality of distortions $D_i$ to obtain an approximation of a function that maps a distortion to an estimated average bitrate; and encoding each frame with a distortion level determined from said function.

A more complete understanding of the present invention, as well as further features and advantages of the present invention, will be obtained by reference to the following detailed description and drawings.

DETAILED DESCRIPTION

Figure 1:
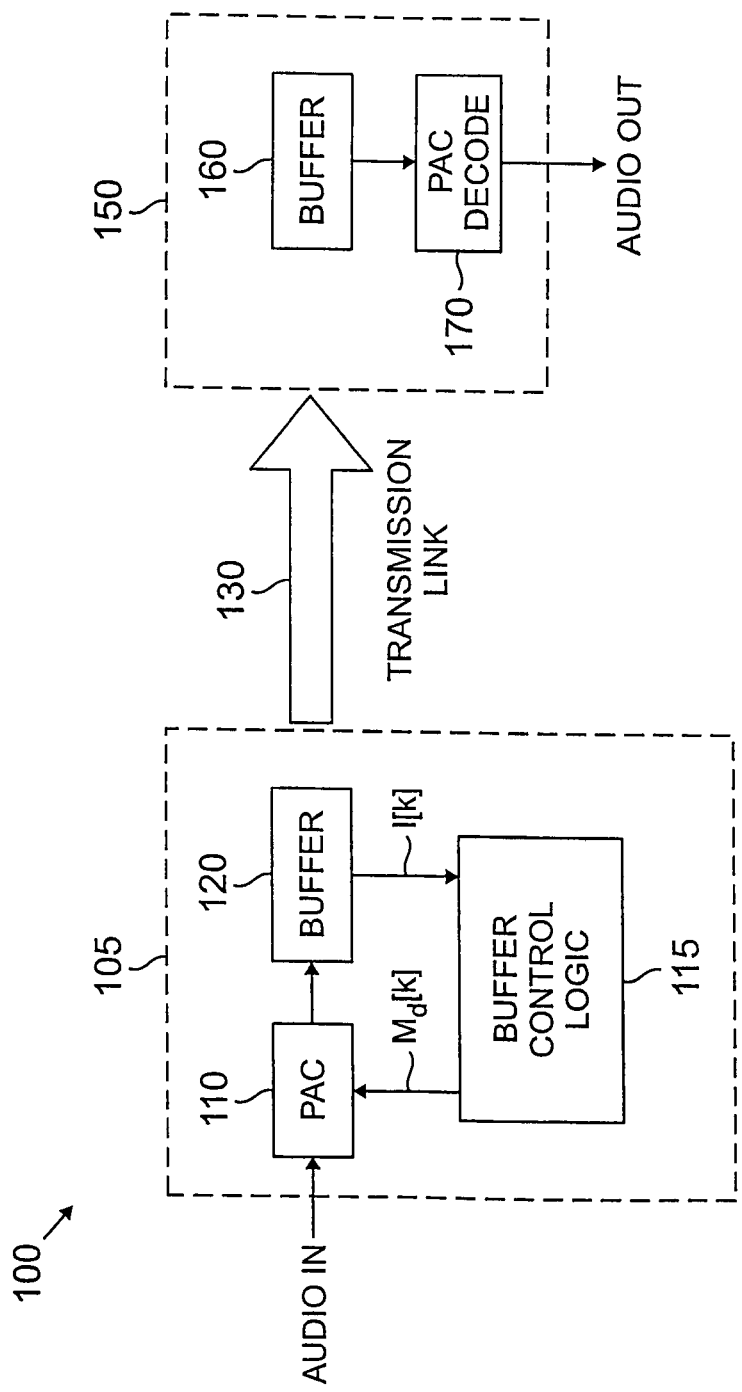
FIG. 1 illustrates a conventional audio communication system.
Figure 2:
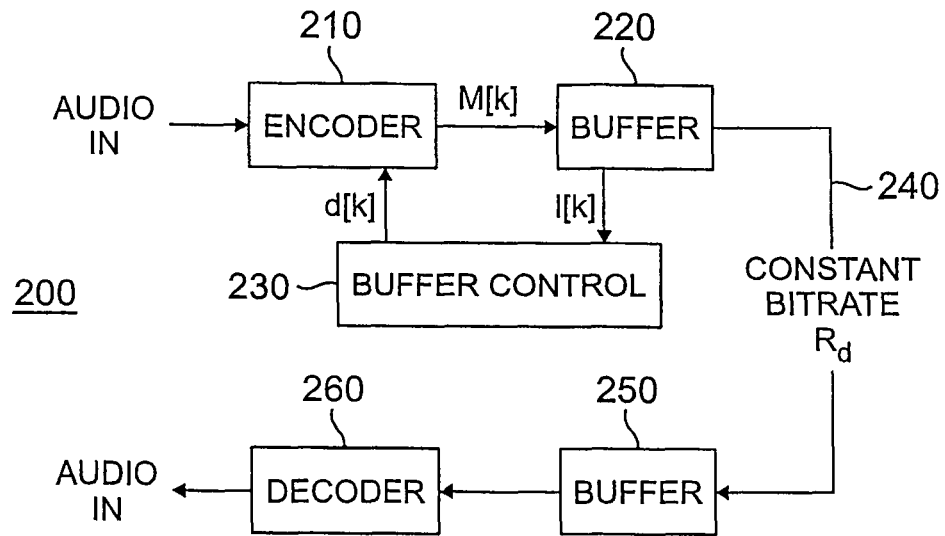
FIG. 2 illustrates a DAB communication system in accordance with the present invention.

FIG. 2 illustrates a communication system 200 in accordance with the present invention. As shown in FIG. 2, the communication system 200 has an audio encoder 210 and decoder 260 with a buffered bit stream for a constant bit rate transmission of the bits. The buffered bit stream is achieved using an encoder buffer 220 and a decoder buffer 250. As shown in FIG. 2, the M[k] bits of the encoded frame, at the time of each frame k, are put into the FIFO buffer 220 while $R_d$ bits are removed from the FIFO buffer 220 by the constant bit rate transmission channel 240. The number of data bits in the encoder buffer 220 can be expressed iteratively as:

$$l[k]=l[k-1]+M[k]-R_d, \qquad (1)$$

with an initial buffer level of l[0] equal to $l_d$ bits. A buffer control element 230 monitors the buffer level l[k] and influences the encoding process to ensure that the buffer 220 does not overflow. Buffer underflow can be easily prevented by padding additional (non-used) bits to the frame when underflow would occur.

According to one aspect of the present invention, the buffer control element 230 determines, for each frame, the distortion d[k] at which the frame is to be encoded. Generally, the buffer control element 230 determines the distortion d[k] such that the probability for buffer overflow is virtually zero and such that the variation of perceived distortion over time is minimized. Thus, the present invention strives to provide constant distortion over time.

Optimal Audio Coding with an Average Desired Bitrate

In the optimal case of encoding an audio signal with a constant distortion D[k] equal to $D_R$, the average bitrate R is unknown prior to encoding the whole audio signal, where R is expressed as follows:

$$R = \frac{1}{N}\sum_{k=1}^{N} M[k]\bigg|_{D_R} \qquad (2)$$

Figure 3:
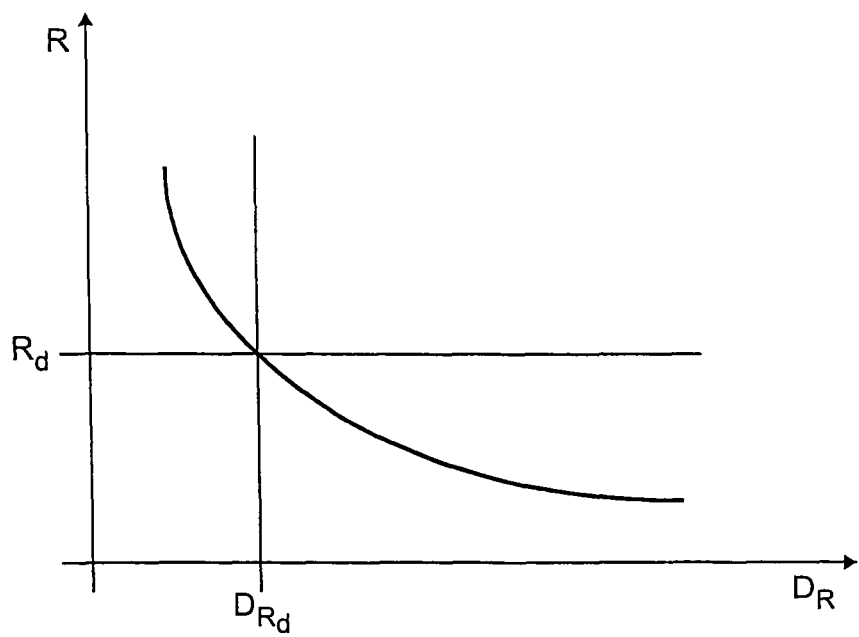
FIG. 3 graphically illustrates the average bit rate, R, as a function of the distortion level, when there is no buffer constraint.

For an average bitrate equal to a desired bitrate of $R_d$, one can encode the audio signal iteratively for different distortions until the average rate R is equal to the desired bitrate $R_d$. FIG. 3 shows schematically the average bitrate R as a function of the constant distortion D[k] equal to $D_R$ and the point $(D_{R_d}, R_d)$ at which the signal is encoded.

The method described for the optimal case of constant distortion is suitable for encoding audio signals in cases when the whole signal is given at once and if there is no buffer constraint. While this method is not particularly suitable for applications where the entire signal is not available before encoding (e.g., in real-time applications or applications with limited signal buffers), the method may be applied where the entire signal is available, such as for the storage of audio signals.

Real-Time Audio Coding with an Average Desired Bitrate

The goal is to approximate the ideal case of encoding the audio signal with a constant distortion $D_{R_d}$. Without introducing any additional delay in the audio coder, at the time of frame k only frames k, k−1, k−2, . . . are given. Instead of considering the average bitrate, R, over the whole audio signal, the average bitrate is estimated locally in time, as follows:

$$R[k] = \sum_{i=k-W+1}^{k} w[i] M[i]_{D_R[k]}, \tag{3}$$

where w[i] is the estimation window having a time span of W frames.

Each frame k of the audio signal is encoded with a distortion $D_{R_d}[k]$ such that the estimated average bitrate R[k] is equal to the desired bitrate $R_d$. For each frame k, the distortion $D_{R_d}[k]$ can be computed iteratively by encoding the audio signal within the window w[i] for different distortions until the estimated average rate R[k] is equal to the desired bitrate $R_d$.

The described method is suitable for real-time applications since it does not require any lookahead.

Real-Time Audio Coding with a Buffer Constraint

If for each frame, the distortion is chosen to be $D_{R_d}[k]$, as described in the previous section, then the expected long-term average bitrate of the audio coder is $R_d$. However, the variance of the buffer-level is monotonically increasing over time. If it is assumed that $$eM[k] = M[k]|_{D_{Rd[k]}} - R_d \tag{4}$$

is an independent and identically distributed (i.i.d.) random variable with a variance of $\sigma^2$, then the buffer level l[k] is the sum of k i.i.d. random variables with a total variance of k $\sigma^2$.

Figure 4:
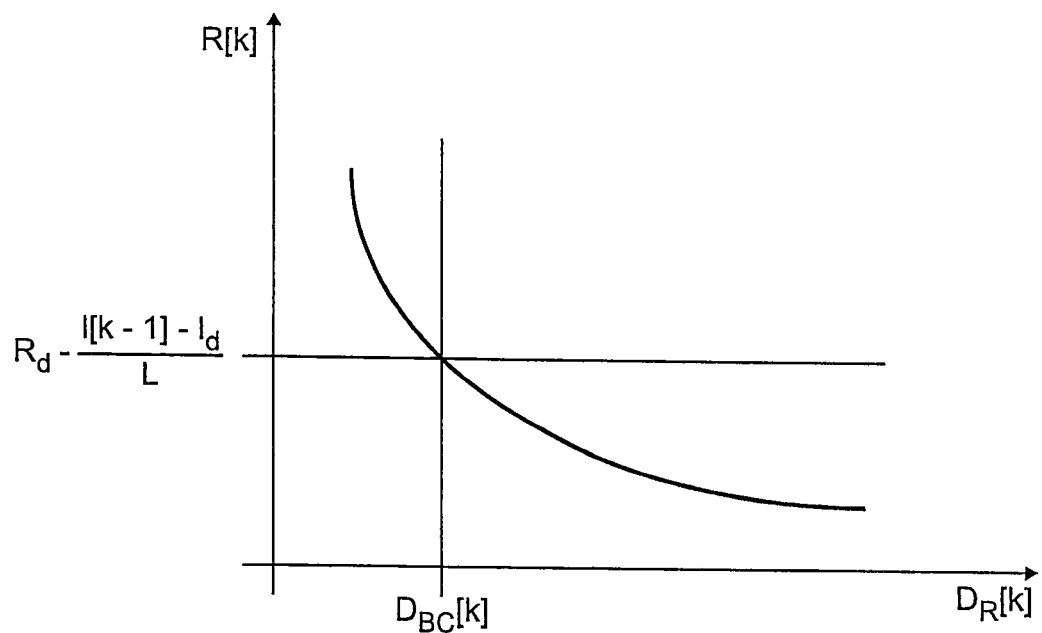
FIG. 4 graphically illustrates the average bit rate, R, as a function of the distortion level, when there is a buffer constraint.

To encode the audio signal such that the variance of the buffer level has an upper bound, the distortion for each frame $D_{BC}[k]$ is chosen such that the estimated average bitrate R[k] is equal to $$R_{BC}[k] = R_d - C(l[k-1]) \tag{5}$$

where C(l) is a correction term that corrects for the bit rate. Each frame has an expected bitrate of $R_{BC}[k]$ instead of the desired bitrate $R_d$. Thus, the buffer-level is statistically driven to the desired buffer-level $l_d$. In one implementation, the correction factor is chosen as follows:

$$C(l) = \frac{l[k-1] - l_d}{L} \tag{5A}$$

where L determines the weighting of the buffer level deviation on the chosen average bitrate in equation (3). If the correction factor, C, is chosen in accordance with equation 5A, then the buffer-level is statistically driven to the desired buffer-level $l_d$ with a time constant of LT seconds. T is the duration of one frame in seconds. In an exemplary implementation, L was set to 50. FIG. 4 shows the estimated average bitrate R[k] as a function of the distortion $D[k] = D_R[k]$ and the point at which a frame is encoded.

When the audio signal is encoded with distortions $D_{BC}[k]$, the mean of the buffer-level $E\{l[k]\}$ is $l_d$ and the variance $\sigma^2_{l[k]}$ is upper bounded by $$\sigma_e^2 \frac{1}{1 - \left(1 - \frac{1}{L}\right)^2} \tag{6}$$

where $\sigma^2_e$ is $E\{e^2[k]\}$ with $$e[k] = M[k] - \left(R_d - \frac{l[k-1] - l_d}{L}\right) \tag{7}$$

The variable e[k] is assumed to be i.i.d. with zero mean. For the derivation of the mean $E\{l[k]\}$ and the bound for the variance in equation (6), the buffer-level from equation (1) can be rewritten with equation (7) as:

$$l[k] = 1 - \frac{1}{L} - l[k-1] + \frac{1}{L} l_d + e[k] \tag{8}$$

With an initial buffer-level of l[0] equal to $l_d$ and the first frame to be encoded k equal to 1, equation (8) is written non-iteratively as $$l[k] = l_d + \sum_{i=1}^{k} e[i] \left(1 - \frac{1}{L}\right)^{k-1} \tag{9}$$

Using equation (9), and considering that e[k] has zero mean, yields $$E\{l[k]\} = l_d \tag{10}$$

and the variance $\sigma^2_{l[k]}$ as a function of k is $$\sigma^2_{l[k]} = E\{(1[k] - l_d)^2\} = \sum_{i=1}^{k} \sigma_e^2 \left(1 - \frac{1}{L}\right)^{2(k-i)} \tag{11}$$

Given equation (11) one can easily show that the variance of the buffer-level converges to the value given in equation (6).

Efficient Implementation

In this section, a scheme is described for efficient implementation of the buffer control and rate control schemes described above.

The buffer control scheme needs to find for each frame, k, the solution of equation (1) for R[k] equal to $R_{BC}[k]$. For each frame k, the function $f_k$ is approximated which maps the distortion $D_R[k]$ to the estimated average bitrate R[k] (FIG. 4), $$R[k] = f_k(D_R[k]) \tag{12}$$

by linearly interpolating between a set of computed discrete points. The discrete points are obtained by computing the estimated bitrates $\{R_i[k]\}$ given a set of predefined distortions $\{D_i\}$, $$R_i[k] = \sum_{i=k-W+1}^{k} w[i]M[i]\Big|_{D_i} \quad (13)$$

Figure 5:
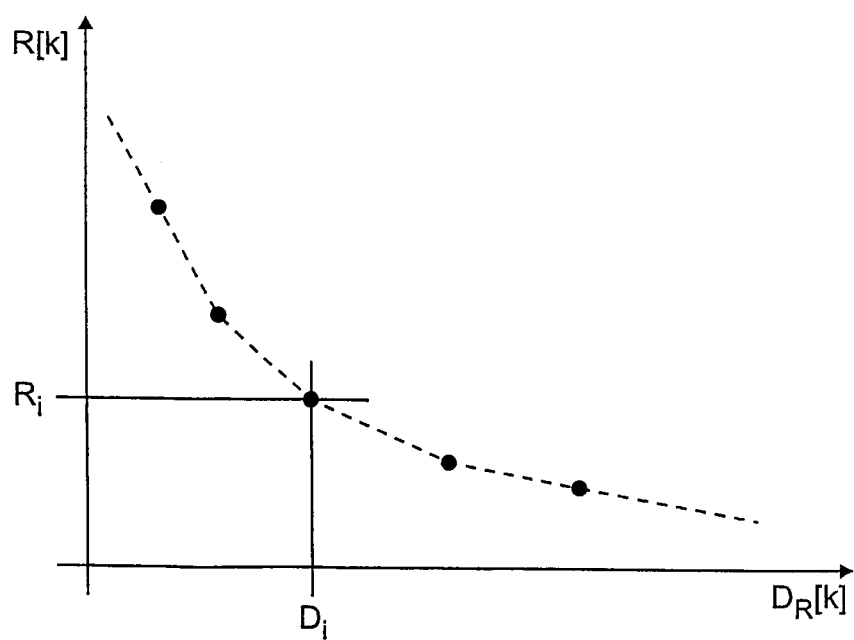
FIG. 5 graphically illustrates the average bit rate, R, as a function of the distortion level, approximated using a linear interpolation technique.

With $i \in \{1, 2, \ldots, I\}$. FIG. 5 shows an example of the approximation of $f_k$ given the discrete points $(R_i, D_i)$. Given $f_k$, frame k is encoded with a distortion of $$D_{BC}[k] = f\frac{-1}{k}(R_{BC}[k]) \quad (14)$$

Each frame k of the audio signal is encoded with the following algorithm:
1. Encode frame k for each of the I distortions $D_i$ to compute the frame bitrate $M[k]|D_i$.
2. Estimate the average bitrate $R_i[k]$ for each distortion $D_i$ given current and past frame bitrates.
3. Interpolate between the values $R_i[k]$, $D_i$ to obtain an approximation of the functions (FIG. 5).
4. Encode the frame with a distortion of $D_{BC}[k]$.

The number of coding iterations for each frame is thus I+1.

The estimated average bitrate R[k] is accurately computed as a function of the distortion $D_R[k]$ for PAC for a wide variety of audio signals. It can be shown that $f_k$ can be approximated by just computing one point $(D_1, R_1[k])$, $$R[k]=f_k(DR[k]\approx qD_R[k]-D_1)+R_1[k] \quad (15)$$

The number of coding iterations for encoding each frame of PAC is only 2 (I=1). Therefore, the new scheme is significantly less complex than PAC's previous iterative scheme. PAC's previous iterative scheme requires significantly more coding iterations for each frame to be encoded.

Joint Encoder

Figure 6:
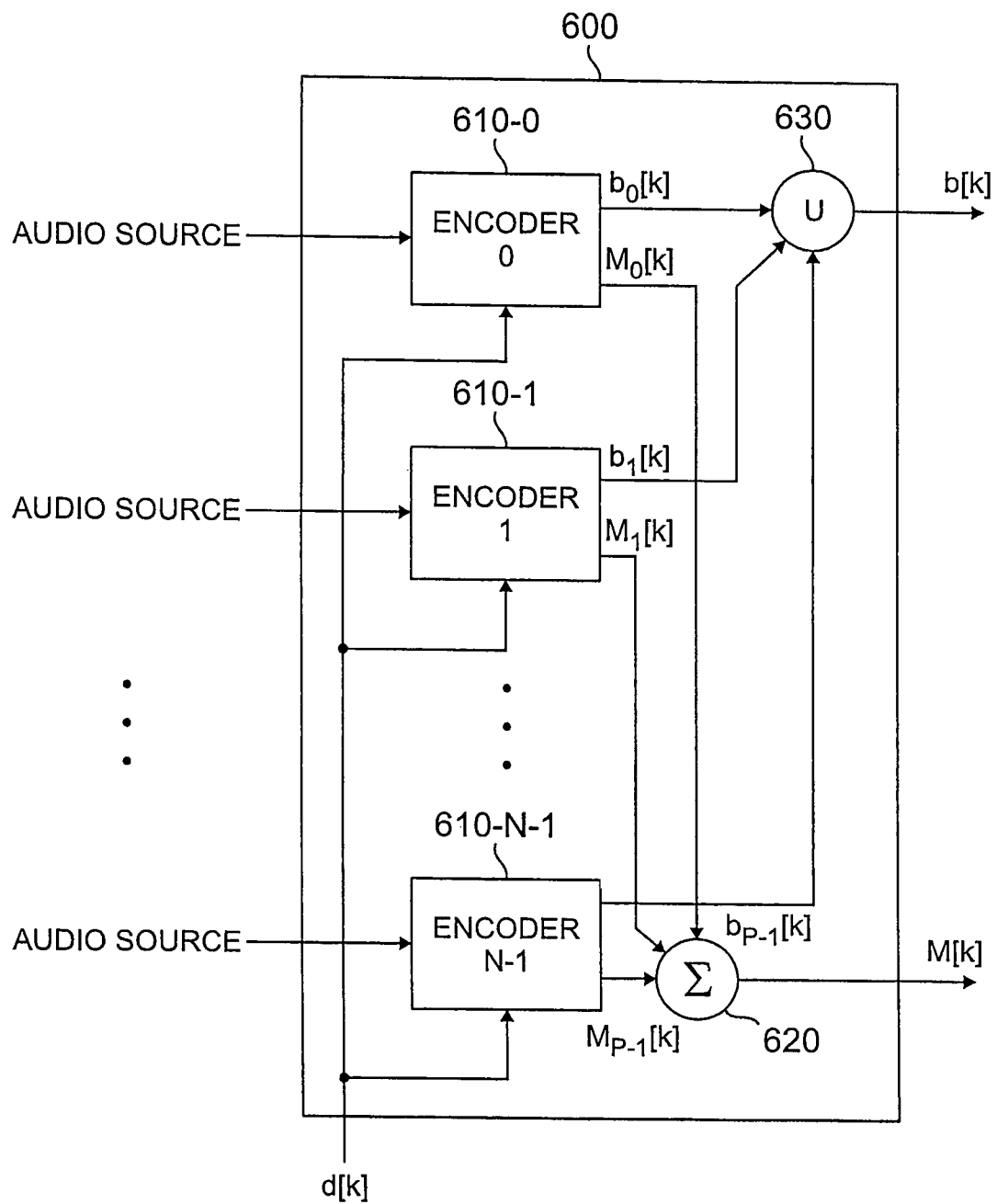
FIG. 6 illustrates a joint encoder that provides improved buffer control in accordance with the present invention for a multiplexed stream of N audio programs in a multiple channel DAB communication system.

FIG. 6 illustrates a joint encoder 600 that multiplexes N audio programs into one bitstream for use in a multiple channel communication system. In such a multiple channel communication system, N audio channels (e.g., N can be on the order of 100) are sampled and each sampled signal is applied to a corresponding audio encoder 610-0 through 610-N−1 (hereinafter, collectively referred to as audio encoders 610). The bit streams, $b_N[k]$, generated by each audio encoder 610 are multiplexed using a multiplexer 620. The joint bit stream, b[k], may be buffered by a FIFO buffer (not shown) to form a composite bit stream of a very high bit rate. The value $M_N[k]$ indicates the length of the corresponding encoded frame, $b_N[k]$. This composite bit stream is modulated and transmitted as a wide band radio signal to a receiver (not shown). At the receiver, the composite bit stream is recovered from the incoming signal and demultiplexed by a bitstream parser (not shown). All channels are generally discarded except for the channel that is currently selected for listening. The bit stream of the selected channel is buffered by a FIFO buffer, decoded by an audio decoder 280 and converted to an analog audio signal.

The buffer control techniques of the present invention can also be applied to joint encoders, such as the joint encoder 600 shown in FIG. 6, by treating the joint encoder as a single encoder and deriving a joint distortion measure d[k]. Each audio coder 610 has an assigned target or default quality level, and the common distortion measure d[k] is a measure on how much each audio coder 610 diverges from their target qualities. In this manner, each audio coder 610 moves in parallel with the other audio coders 610, and no single audio coder 610 is favored.

It is to be understood that the embodiments and variations shown and described herein are merely illustrative of the principles of this invention and that various modifications may be implemented by those skilled in the art without departing from the scope and spirit of the invention.

I claim:
1. In a communication system, a method for controlling a buffer level, said method comprising the steps of:
    partitioning a signal into a sequence of successive frames;
    estimating a distortion rate for a plurality of said frames; and
    selecting a distortion by a buffer control element such that said distortion is minimized and such that a variance of said buffer level is bounded by a specified value.
2. The method of claim 1, wherein said buffer level remains below said specified value by selecting a distortion for each frame of a signal such that an estimated average bitrate is equal to a bitrate adjusted by a correction factor.
3. The method of claim 1, wherein said buffer level remains below said specified value by selecting a distortion for each frame of a signal, $D_{BC}[k]$, such that an estimated average bitrate R[k] is equal to

$$R_{BC}[k] = R_d - \frac{l[k-1]-l_d}{L}$$

where L determines a weighting of a buffer level deviation on a chosen average bitrate.
4. The method of claim 1, wherein said communication system is a digital audio broadcasting (DAB) system.
5. The method of claim 1, wherein said communication system employs perceptual audio coding.
6. In a communication system, a method for coding a signal based on a perceptual model, said method comprising the steps of:
    estimating an average bitrate R[k] locally in time for a plurality of frames;
    determining by a buffer control element a distortion $D_{R_d}[k]$ such that said distortion is minimized and such that said estimated average bitrate R[k] is equal to a desired bitrate $R_d$; and
    encoding each of said frames with said distortion $D_{R_d}[k]$.
7. The method of claim 6, wherein said encoding step further comprises the step of computing the distortion $D_{R_d}[k]$ iteratively for each of said frames by encoding the signal within a window w[i] of frames for different distortions until said estimated average bitrate R[k] is equal to said desired bitrate $R_d$.
8. The method of claim 6, further comprising the step of ensuring that a variance of a buffer level has an upper bound, by selecting a distortion for each frame of a signal such that the estimated average bitrate R[k] is equal to a desired bitrate adjusted by a correction factor.
9. The method of claim 6, further comprising the step of ensuring that a variance of a buffer level has an upper bound, by selecting the distortion for each frame $D_{BC}[k]$ such that the estimated average bitrate R[k] is equal to $$R_{BC}[k] = R_d - \frac{l[k-1] - l_d}{L}$$

where L determines a weighting of a buffer level deviation on a chosen average bitrate.

10. The method of claim 6, wherein said encoding step further comprises the steps of:
   encoding each frame k for each of a plurality of distortions $D_i$ to compute a frame bitrate;
   estimating an average bitrate $R_i[k]$ for each of said plurality of distortions $D_i$ given current and past frame bitrates;
   approximating a function that maps a distortion to an estimated average bitrate; and
   encoding each frame with a distortion level determined from said function.

11. The method of claim 10, wherein said step of estimating a function further comprises the step of interpolating between each of said pair of values for said average bitrate $R_i[k]$ and said plurality of distortions $D_i$.

12. In a communication system, a method for jointly coding a plurality of signals based on a perceptual model, said method comprising the steps of:
   estimating an average bitrate R[k] locally in time for a plurality of frames associated with each of said signals; and
   determining by a buffer control element a joint distortion measure d[k] for all of said signals such that said distortion is minimized and such that a variance of a buffer level is bounded by a specified value, said joint distortion measure d[k] providing a measure of how much an audio coder associated with each of said signals should diverge from a target quality.

13. The method of claim 12, wherein said buffer level remains below said specified value by selecting a distortion for each frame of a signal such that the estimated average bitrate is equal to a desired bitrate adjusted by a correction factor.

14. A system for controlling a buffer level in a communication system, wherein a signal is partitioned into a sequence of successive frames, comprising:
   a buffer control element for selecting a distortion such that said distortion is minimized and such that a variance of said buffer level is bounded by a specified value based on an estimated distortion rate for a plurality of said frames.

15. The system of claim 14, wherein said buffer level remains below said specified value by selecting a distortion for each frame of a signal such that an estimated average bitrate is equal to a desired bitrate adjusted by a correction factor.

16. The system of claim 14, wherein said buffer is in a joint encoder that encodes a plurality of signals and wherein said processor is further configured to:
   estimate an average bitrate R[k] locally in time for a plurality of frames associated with each of said plurality of signals; and
   determine a joint distortion measure d[k] for all of said plurality of signals such that a variance of a buffer level is bounded by a specified value, said joint distortion measure d[k] providing a measure of how much an audio coder associated with each of said plurality of signals should diverge from a target quality.

17. A communication system, comprising:
   a buffer control element for determining a distortion $D_{R_d}[k]$ such that an estimated average bitrate R[k] is equal to a desired bitrate $R_d$, wherein said average bitrate R[k] is estimated locally in time for a plurality of frames; and
   an encoder for encoding each of said frames with said distortion $D_{R_d}[k]$ based on a perceptual model.

18. The communication system of claim 17, wherein said buffer control element is further configured to compute the distortion $D_{R_d}[k]$ iteratively for each of said frames by encoding the signal within a window w[i] of frames for different distortions until said estimated average bitrate R[k] is equal to said desired bitrate $R_d$.

19. The communication system of claim 17, wherein said buffer control element is further configured to ensure that a variance of a buffer level has an upper bound, by selecting a distortion for each frame of a signal such that the estimated average bitrate R[k] is equal to a desired bitrate adjusted by a correction factor.

20. The communication system of claim 17, wherein said buffer control element is further configured to ensure that a variance of a buffer level has an upper bound, by selecting the distortion for each frame $D_{BC}[k]$ such that the estimated average bitrate R[k] is equal to $$R_{BC}[k] = R_d - \frac{l[k-1] - l_d}{L}$$

where L determines a weighting of a buffer level deviation on a chosen average bitrate.

21. The communication system of claim 17, wherein said encoder is further configured to:
   encode each frame k for each of a plurality of distortions $D_i$ to compute a frame bitrate;
   estimate an average bitrate $R_i[k]$ for each of said plurality of distortions $D_i$ given current and past frame bitrates;
   approximate a function that maps a distortion to an estimated average bitrate; and
   encode each frame with a distortion level determined from said function.

22. A communication system for jointly coding a plurality of signals based on a perceptual model, comprising:
   a buffer control element for determining a joint distortion measure d[k] for all of said signals such that a variance of a buffer level is bounded by a specified value, said joint distortion measure d[k] providing a measure of how much an audio coder associated with each of said signals should diverge from a target quality based on an average bitrate R[k] locally in time for a plurality of frames associated with each of said signals.

23. The communication system of claim 22, wherein said buffer level remains below said specified value by selecting a distortion for each frame of a signal such that the estimated average bitrate is equal to a desired bitrate adjusted by a correction factor.

* * * * *